United States Patent
Walsh

(10) Patent No.: US 10,259,202 B2
(45) Date of Patent: Apr. 16, 2019

(54) FLUOROPOLYMER COMPOSITE FILM WRAPPED WIRES AND CABLES

(71) Applicant: Rogers Corporation, Rogers, CT (US)

(72) Inventor: Edward D. Walsh, East Greenwich, RI (US)

(73) Assignee: ROGERS CORPORATION, Rogers, CT (US)

( * ) Notice: Subject to any disclaimer, the term of this patent is extended or adjusted under 35 U.S.C. 154(b) by 85 days.

(21) Appl. No.: 15/417,881

(22) Filed: Jan. 27, 2017

(65) Prior Publication Data
US 2017/0217138 A1 Aug. 3, 2017

Related U.S. Application Data

(60) Provisional application No. 62/288,414, filed on Jan. 28, 2016, provisional application No. 62/421,722, filed on Nov. 14, 2016.

(51) Int. Cl.
*B32B 27/08* (2006.01)
*B32B 7/12* (2006.01)
(Continued)

(52) U.S. Cl.
CPC .............. *B32B 27/08* (2013.01); *B32B 3/26* (2013.01); *B32B 3/266* (2013.01); *B32B 3/30* (2013.01); *B32B 5/24* (2013.01); *B32B 7/04* (2013.01); *B32B 7/12* (2013.01); *B32B 27/20* (2013.01); *B32B 27/288* (2013.01); *B32B 27/304* (2013.01); *B32B 27/322* (2013.01); *H01B 3/306* (2013.01); *H01B 3/445* (2013.01); *H01B 7/18* (2013.01); *H01B 7/36* (2013.01);
(Continued)

(58) Field of Classification Search
CPC . B32B 7/12; B32B 5/24; Y10T 428/24; Y10T 428/249953; Y10T 428/2924; Y10T 428/2978
See application file for complete search history.

(56) References Cited

U.S. PATENT DOCUMENTS

| 3,579,370 A | 5/1971 | Punderson et al. |
| 3,953,566 A | 4/1976 | Gore |

(Continued)

FOREIGN PATENT DOCUMENTS

| WO | 2010078378 A1 | 7/2010 |
| WO | 2014058961 A1 | 4/2014 |

OTHER PUBLICATIONS

International Search Report and Written Opinion issued in International Application No. PCT/US2017/015321 dated Apr. 10, 2017. 21 Pages.

(Continued)

*Primary Examiner* — Betelhem Shewareged
(74) *Attorney, Agent, or Firm* — Cantor Colburn LLP

(57) ABSTRACT

A fluoropolymer composite film wire or cable wrap comprises an outer layer of expanded polytetrafluoroethylene (ePTFE) and an inner layer of melt processable fluoropolymer film. The inner and outer layers are laminated with each other in tape form, such as by the application of heat and/or pressure thereto. The fluoropolymer composite tape is wrapped about one or more wires or cables, and is heated or sintered after wrapping to bond the tape to the wire or cable, and bond the tape to itself at the seams.

50 Claims, 4 Drawing Sheets

(51) Int. Cl.
*B32B 5/24* (2006.01)
*B32B 3/26* (2006.01)
*B32B 3/30* (2006.01)
*B32B 27/32* (2006.01)
*H01B 3/30* (2006.01)
*H01B 3/44* (2006.01)
*H01B 7/18* (2006.01)
*H01B 7/36* (2006.01)
*B32B 7/04* (2019.01)
*B32B 27/20* (2006.01)
*B32B 27/28* (2006.01)
*B32B 27/30* (2006.01)
*H01B 13/10* (2006.01)
*H01B 13/08* (2006.01)
*H01B 7/02* (2006.01)

(52) U.S. Cl.
CPC ....... *B32B 2250/02* (2013.01); *B32B 2250/24* (2013.01); *B32B 2250/242* (2013.01); *B32B 2255/10* (2013.01); *B32B 2264/102* (2013.01); *B32B 2264/108* (2013.01); *B32B 2270/00* (2013.01); *B32B 2307/206* (2013.01); *B32B 2307/402* (2013.01); *B32B 2307/4026* (2013.01); *B32B 2307/414* (2013.01); *B32B 2307/514* (2013.01); *B32B 2307/516* (2013.01); *B32B 2307/554* (2013.01); *B32B 2307/72* (2013.01); *B32B 2307/732* (2013.01); *B32B 2457/04* (2013.01); *B32B 2605/18* (2013.01); *H01B 7/0241* (2013.01); *H01B 13/08* (2013.01); *H01B 13/103* (2013.01); *Y10T 428/24* (2015.01); *Y10T 428/249953* (2015.04); *Y10T 428/2924* (2015.01); *Y10T 428/2978* (2015.01)

(56) References Cited

U.S. PATENT DOCUMENTS

| | | |
|---|---|---|
| 4,000,348 A | 12/1976 | Harlow |
| 4,128,693 A | 12/1978 | Dhami et al. |
| 4,391,764 A * | 7/1983 | Edinger .................. C08K 3/04 219/121.6 |
| 4,701,576 A | 10/1987 | Wada et al. |
| 4,801,501 A | 1/1989 | Harlow |
| 4,816,330 A | 3/1989 | Freund et al. |
| 4,833,026 A | 5/1989 | Kausch |
| 4,866,212 A | 9/1989 | Ingram |
| 4,924,037 A | 5/1990 | Ainsworth et al. |
| 4,943,473 A | 7/1990 | Sahatjian et al. |
| 4,946,736 A | 8/1990 | Sassa |
| 5,106,673 A | 4/1992 | Effenberger et al. |
| 5,107,852 A | 4/1992 | Davidson et al. |
| 5,210,377 A | 5/1993 | Kennedy et al. |
| 5,220,133 A | 6/1993 | Sutherland et al. |
| 5,245,134 A | 9/1993 | Vana et al. |
| 5,262,589 A | 11/1993 | Kesler |
| 5,264,276 A | 11/1993 | McGregor et al. |
| 5,296,287 A | 3/1994 | Ribbans |
| 5,374,473 A | 12/1994 | Knox et al. |
| 5,415,939 A | 5/1995 | Yeung |
| 5,426,264 A | 6/1995 | Livingston et al. |
| 5,440,805 A | 8/1995 | Daigle et al. |
| 5,466,531 A | 11/1995 | Tippett et al. |
| 5,473,118 A | 12/1995 | Fukutake et al. |
| 5,477,011 A | 12/1995 | Singles et al. |
| 5,496,628 A | 3/1996 | Ribbans |
| 5,554,236 A | 9/1996 | Singles et al. |
| 5,560,986 A | 10/1996 | Mortimer, Jr. |
| 5,636,551 A * | 6/1997 | Davidson ............... D07B 1/162 29/434 |
| 5,766,750 A | 6/1998 | Korleski |
| 5,879,789 A | 3/1999 | Dolan et al. |
| 5,879,794 A | 3/1999 | Korleski |
| 5,935,667 A | 8/1999 | Calcote et al. |
| 5,981,614 A | 11/1999 | Adiletta |
| 6,016,848 A | 1/2000 | Egres, Jr. |
| 6,197,393 B1 | 3/2001 | Jing et al. |
| 6,346,328 B1 | 2/2002 | Parsonage et al. |
| 6,475,591 B2 | 11/2002 | Mushaben |
| 6,479,161 B1 | 11/2002 | Araki et al. |
| 6,676,993 B2 | 1/2004 | Klare |
| 6,677,535 B2 | 1/2004 | Dlugas |
| 6,790,526 B2 | 9/2004 | Vargo et al. |
| 6,849,314 B2 | 2/2005 | Jing et al. |
| 6,887,334 B2 | 5/2005 | Cherpinsky et al. |
| 6,969,740 B2 | 11/2005 | Klosiewicz |
| 7,022,402 B2 | 4/2006 | Lacourt |
| 7,211,308 B2 | 5/2007 | Rhee et al. |
| 7,220,916 B2 | 5/2007 | Schwamborn et al. |
| 7,521,010 B2 | 4/2009 | Kennedy et al. |
| 8,092,629 B2 | 1/2012 | Aburatani et al. |
| 8,585,753 B2 | 11/2013 | Scanlon et al. |
| 2001/0000857 A1* | 5/2001 | Hebestreit ................ G10D 3/10 84/120 |
| 2003/0194599 A1 | 10/2003 | Sassa et al. |
| 2004/0259446 A1 | 12/2004 | Jain et al. |
| 2005/0014432 A1 | 1/2005 | Jain et al. |
| 2005/0077202 A1 | 4/2005 | Blum et al. |
| 2005/0130521 A1 | 6/2005 | Wyner et al. |
| 2005/0186372 A1 | 8/2005 | Shah et al. |
| 2005/0186376 A1 | 8/2005 | Rhee et al. |
| 2005/0266754 A1 | 12/2005 | Wyner et al. |
| 2006/0205893 A1 | 9/2006 | Howard et al. |
| 2007/0190284 A1 | 8/2007 | Park |
| 2008/0061472 A1 | 3/2008 | Kennedy et al. |
| 2010/0034504 A1 | 2/2010 | Aten et al. |
| 2010/0206377 A1 | 8/2010 | Sahlin et al. |
| 2010/0209681 A1 | 8/2010 | Lee et al. |
| 2011/0008600 A1 | 1/2011 | Walsh |
| 2013/0152761 A1 | 6/2013 | Nesbitt |
| 2014/0205815 A1 | 7/2014 | Hodgins et al. |
| 2016/0019997 A1 | 1/2016 | Adamchuk et al. |

OTHER PUBLICATIONS

Norton, PTFE Films, Saint-Gobain, 2005.

* cited by examiner

FLUOROPOLYMER COMPOSITE FILM WRAPPED WIRES AND CABLES

CROSS-REFERENCE TO RELATED APPLICATION

This patent application claims benefit under 35 U.S.C. § 119 to U.S. provisional patent application Ser. No. 62/288,414, filed Jan. 28, 2016, and U.S. provisional patent application Ser. No. 62/421,722, filed Nov. 14, 2016, each of which is entitled "Fluoropolymer Composite Films For Wrapping Wire And Cable," and is hereby incorporated by reference in its entirety as part of the present disclosure.

FIELD OF THE INVENTION

The present invention relates to wire and cable wraps, and more particularly, to wire and cable wraps, and to the resulting wrapped wire and cable, formed of fluoropolymer composite film laminations.

BACKGROUND INFORMATION

The aerospace industry has unique requirements for the insulation of wires and cables. Due to weight constraints, the industry has progressively moved toward thinner insulation for wires and wire bundles. The extrusion of melt processable fluoropolymers is well known in the aerospace field for manufacturing an insulation layer for high temperature wire and cable. Because the melt fluoropolymer materials can melt and fuse together, the material is laid down in one continuous layer. The melt fluoropolymer extrusion process provides a layer of insulation with a generally smooth exterior surface around the wire, without any seam or overlap, and therefore the extrusion construction is generally considered "seamless." However, the extrusion of melt fluoropolymer films has not been as reliable as desired with respect to obtaining a uniform, thin layer of insulation on the wires. This drawback has led to the use of unsintered polytetrafluoroethylene (PTFE) and tape wrap for insulating wires and cables. The tape insures a layer of relatively uniform thickness for insulating and protecting the wire. However, by wrapping the tape around the wire, and then attempting to fuse the layers of tape, an overlap seam is created, as shown typically in FIG. 3. This type of seam has been a cause of significant concern. For example, the overlapping seam can be a significant drawback when the wires are installed into the frames of airplanes or other aircraft. Such wires are required to pass a variety of relatively extreme tests, including a wet arc electrical insulation test, a scrape abrasion test, and a minimum contrast level for marking wires test. The PTFE tape wrapped constructions have had difficulty consistently meeting the criteria for, or in passing all of these tests.

Many prior art tape wrapped constructions are supplied using a tape that is known as an unsintered extruded PTFE, which is extruded in a flat form, calendared to a desired thickness, and then slit to a desired width. Specialized equipment is then used to wrap the tape onto wires or bundles of wires, and then the wrapped wires or bundles of wires are heated (or sintered) to fuse the wrapped PTFE tapes thereto. The PTFE tapes typically include fillers that turn the tape white when wrapped and sintered. This material forms the outer layer of insulation for the wires or the outer layer of the wrap or jacket for bundles of wires. The PTFE tape can be filled with a material, such as TIO2 or a similar filler that is white, but that turns dark (e.g., black) when a laser of known energy and/or wavelength is transmitted into the filler within the PTFE tape. As a result, the laser can be used to mark indicia, such as numbers, letters or others markings to identify, for example, a specific wire at the ends of long lengths of wires or cables. One of the drawbacks of these fillers is that it can be difficult to disperse them evenly or uniformly within the PTFE, and as a result, it can be difficult to uniformly or clearly mark the wires, or uniformly mark the wires throughout the lengths of wire. When the filler materials are not dispersed evenly, the marking will vary, and will not meet the uniform contrast levels that must be achieved or that otherwise are desired. Another and even more alarming drawback associated with non-uniform distribution of the filler material is that it can form agglomerations which can, in turn, cause voids in the insulation that can lead to shorting of the wire. The testing of these wires can include a "wet arc" test which is an aggressive aerospace test that checks the finished wire in a wet environment to find weak spots in the wires. Tape wrapped wires with fillers in the PTFE can have difficulty in passing such tests, or can lead to shorting of the wires if the problems are not detected during testing.

Another drawback of the above-mentioned PTFE tape wrap is the overlapping seam. The overlapping seam creates a ridge at the overlap as shown typically in FIG. 3. The PTFE does not undergo a melt process as does the melt processable fluoropolymers described above, but rather goes into a transition or gel-like state when heated. When in the transition state, the PTFE may bond to itself and form a seal at the overlapping seam. However, the inherent properties of PTFE can prevent the formation of an adequate bond or seal. One of the tests performed on such wrapped wires to ensure that the overlap is sufficiently bonded is a "scrape abrasion test." In this test, a bar is brought into contact with the insulated wire, is pressed against the wire with a predetermined force, and is moved or rubbed along a length of the wire at that force, as shown typically in FIGS. 4A and 4B. In order to pass the test, the finished wire must last a defined number of cycles of rubbing without abrading or separating the layers of PTFE. This test has given rise to significant problems with respect to separating layers of tape in PTFE wrap, and many solutions have been reviewed to try to solve the problem. One approach has been referred to as a "seamless tape" because, even though the wire is tape wrapped, the exterior surface resembles that of extrusion made wire. This type of wire uses a tapered-edge film. As shown typically in FIG. 6, the tapered-edge films are overlapped such that the overlap area has very little height differential due to the tapered edge, and thus the finished product can look as though it does not have an overlap or seam. As a result, there is less overlap material to present an edge that can be caught during the scrape abrasion test. This approach has had improved success with respect to scrape abrasion testing. However, since there is still a seam of some dimension, and because of the particular characteristics of the overlapping PTFE fused to itself at the seam, there nevertheless can be problems with abrading and separation at the tapered-edge seams when subjected to the scrape abrasion test.

It is an object of the present invention to overcome one or more of the above-described drawbacks and/or disadvantages of the prior art.

SUMMARY OF THE INVENTION

In accordance with a first aspect, the present invention is directed to a fluoropolymer composite film wire or cable wrap comprising an at least partially sintered ePTFE outer layer configured to form an abrasion-resistant outer surface for a wire or cable received within the wrap. The ePTFE outer layer defines an inner side and an outer side, an overall thickness (T) extending between the inner and outer sides, and a plurality of pores located between the inner and outer sides. An unfilled, melt processable fluoropolymer inner layer is bonded to the inner side of the ePTFE outer layer, and is received within the pores on the inner side of the ePTFE outer layer and is bonded thereto. The unfilled, melt processable fluoropolymer inner layer is configured to contact the wire or cable received within the wrap and forms an electrically insulative barrier between the wire or cable and the ambient atmosphere. The melt processable inner layer extends into a first portion of the ePTFE outer layer defining a first thickness (T1) that is less than the overall thickness (T), but does not extend into a second portion of the ePTFE outer layer extending from the first portion to the outer surface and defining a second thickness (T2). The outer surface of the ePTFE outer layer and the pores or portions thereof in the second portion are not filled with the melt processable fluoropolymer. The surfaces defining the pores in the second portion (i) are configured to receive ink from a printer thereon, and/or (ii) are loaded with a laser-markable pigment for laser marking thereon.

In some embodiments of the present invention, the inner layer defines a thickness within the range of about ¼ mil to about 5 mils, and preferably less than about 3 mils. In some embodiments, the outer layer defines an overall thickness within the range of about ½ mil to about 20 mils, and preferably within the range of about 1 mil to about 5 mils. In some embodiments, the overall thickness of the composite film is within the range of about ½ mil to about 5 mils, and preferably is within the range of about 1 mil to about 2 mils. In some embodiments, the first thickness (T1) is less than the second thickness (T2), may be less than or equal to ½ the second thickness (T2), and also may be less than or equal to ⅓ the second thickness (T2). In some embodiments, the inner layer defines a thickness within the range of about ½ mil to about 2 mils, and the outer layer defines an overall thickness (T) within the range of about 1 mil to about 2 mils. In some embodiments, the inner layer is one or more of FEP, PFA, ECTFE, ETFE, CROSS LINKED ETFE, THV, PEEK, PVDF, or combinations or blends thereof.

In some embodiments of the present invention, the outer layer defines a density within the range of about 1.4 to about 0.2 grams per cubic centimeter ("g/cc"), preferably within the range of about 0.9 to about 0.4 g/cc, and more preferably within the range of about 0.7 to about 0.5 g/cc. In some embodiments, the outer layer is stretched in a machine direction orientation ("MDO") and defines a low density film. In some such embodiments, the outer layer is stretched in a MDO within the range of about a ½ times to about a 20 times stretch ratio. In some embodiments, the outer layer is stretched in a transverse direction orientation ("TDO") and is substantially translucent. In some such embodiments, the inner layer is colored and the color of the inner layer is visible through the substantially translucent outer layer.

In some embodiments of the present invention, the melt processable fluoropolymer is located within substantially all of the pores on the inner side of the outer layer, and is bonded to the outer layer therein. In some embodiments, the outer layer is sintered within the range of partially sintered to fully sintered. In some embodiments, the outer layer includes one or more of (i) a color pigment, (ii) carbon black or other static dissipative filler for static dissipation, and (iii) a polyimide film filler or other abrasion-resistant filler for added abrasion resistance.

Some embodiments of the present invention further comprise one or more wires or cables wrapped within the fluoropolymer composite film. The melt processable fluoropolymer inner layer is in contact with one or more of the wires or cables, and provides an electrically insulative barrier between the wires and/or cables and the ambient atmosphere. The ePTFE outer layer forms an abrasion-resistant exterior surface for the wires and/or cables. Some embodiments of the present invention comprise a bundle of wires and/or cables wrapped within the fluoropolymer composite film. In some such embodiments, one or more of the wires or cables in the bundle is individually wrapped in a respective such fluoropolymer composite film wrap.

In some embodiments of the present invention, the outer layer includes laser marked or ink jet printed indicia thereon. The indicia may take the form of any character, sign or marking for conveying information, such as information about the respective wire(s) and/or cable(s), including alphanumeric characters, such as letters, numbers and/or punctuation marks, bar coding or other optical coding. In some such embodiments, the printed indicia is formed by a solvent based ink. In some embodiments, the outer layer includes a laser-markable pigment, and the laser-markable pigment includes or consists essentially of $TiO_2$, doped $TiO_2$, or combinations thereof.

In some embodiments of the present invention, an edge of the composite film forms a seam. The melt processable fluoropolymer is bonded to a contiguous portion of melt processable fluoropolymer and/or ePTFE at the seam, and thereby forms an abrasion-resistant, fused seam and an abrasion-resistant outer surface of the wrapped wire or cable. In some such embodiments, an edge of the wrapped composite film forms an overlapping seam, and the melt processable fluoropolymer in the overlapping seam is received within pores in the outer surface and second portion of the underlying ePTFE and is bonded thereto. In some such embodiments, the composite film is in the form of a longitudinally-extending tape that is wrapped around the wire or cable, and the marginal edges of the tape overlap one another to define the overlapping seam. In some embodiments, the composite film defines a longitudinally-extending overlapping seam. In some embodiments, the composite film defines a longitudinally-extending butt seam formed by opposing edges of the composite film abutting one another. The opposing edges of the melt processable fluoropolymer layer are fused together at the seam and thereby form an abrasion-resistant outer surface at the seam.

In accordance with another aspect, the present invention is directed to a wire or cable wrap comprising first means for wrapping around the wire or cable and for forming an abrasion-resistant outer surface of the wire or cable. The first means is at least partially sintered, defines an inner side and an outer side, an overall thickness (T) extending between the inner and outer sides, and a plurality of pores located between the inner and outer sides. The wrap also comprises second means for forming an electrically insulative barrier between the wire or cable wrapped within the first means and the ambient atmosphere. The second means is unfilled, is melt processable, is bonded to the inner side of the first means, and is received within the pores on the inner side of the first means and is bonded thereto. The second means extends into a first portion of the first means defining a first thickness (T1) that is less than the overall thickness (T), but does not extend into a second portion of the first means extending from the first portion to the outer surface and defining a second thickness (T2). The outer surface of the first means and the pores or portions thereof in the second portion are not filled with the second means. The surfaces defining the pores in the second portion (i) are configured to receive ink from a printer thereon, and/or (ii) are loaded with a laser-markable pigment for laser marking thereon.

In some embodiments of the present invention, the first means is an ePTFE outer layer, and the second means is a melt processable fluoropolymer inner layer. In some embodiments, the melt processable fluoropolymer film is one or more of FEP, PFA, ECTFE, ETFE, THV, PEEK, PVDF, or combinations or blends thereof. Some embodiments further comprise one or more wires or cables. In such embodiments, the wrap is wrapped about the wires and/or cables, the second means is in contact with one or more of the wires and/or cables, and provides an electrically insulative barrier between the wires and/or cables and the ambient atmosphere. The first means forms an abrasion-resistant exterior surface for the wires and/or cables wrapped within it.

In some embodiments of the present invention, an edge of the wrap forms a seam. The second means is bonded to a contiguous portion of the second means and/or to the first means at the seam, and thereby forms an abrasion-resistant, fused seam and an abrasion-resistant outer surface of the wrapped wire and/or cable. In some embodiments, an edge of the wrap forms an overlapping seam, and the second means in the overlapping seam is received within pores in the outer surface and second portion of the underlying first means and is bonded thereto.

In accordance with another aspect, the present invention is directed to a method comprising the following steps:

(i) Wrapping a composite film about one or more wires or cables. The composite film includes (a) an outer layer of at least partially sintered ePTFE defining an inner side and an outer side, an overall thickness (T) extending between the inner and outer sides, and a plurality of pores extending between the inner and outer sides, and (b) an unfilled, melt processable fluoropolymer inner layer bonded to the inner side of the ePTFE outer layer, received within the pores on the inner side of the ePTFE outer layer and bonded thereto. The melt processable fluoropolymer extends into a first portion of the ePTFE outer layer defining a first thickness (T1) that is less than the overall thickness (T), but does not extend into a second portion of the ePTFE outer layer extending from the first portion to the outer surface and defining a second thickness (T2). The outer surface of the ePTFE outer layer and the pores or portions thereof in the second portion are not filled with the melt processable fluoropolymer. The wrapping includes placing the unfilled, melt processable fluoropolymer inner layer in contact with the one or more wires or cables received within the composite film, and thereby electrically insulating the wires and/or cables within the melt processable fluoropolymer inner layer with respect to the ambient atmosphere;

(ii) Forming at the edges of the composite film wrapped about the wire or cable a seam defining an interface at the melt processable fluoropolymer; and (iii) Heating the wrapped film and allowing the melt processable fluoropolymer to flow across the interface of the seam, bond to a contiguous portion of the melt processable fluoropolymer and/or ePTFE, and thereby form a fused seam and abrasion-resistant outer surface of the wrapped wire and/or cable. The surfaces defining the pores in the second portion of the ePTFE outer layer (i) are configured to receive ink from a printer for printing indicia thereon, and/or (ii) are loaded with a laser-markable pigment for laser marking indicia thereon.

In some embodiments of the present invention, step (i) includes wrapping the fluoropolymer composite film about a bundle of wires and/or cables such that the ePTFE layer forms the exterior surface of the bundle. Some such embodiments further comprise individually wrapping one or more of the wires or cables in the bundle with the composite film.

In some embodiments of the present invention, step (iii) further comprises at least partially sintering to fully sintering the outer layer of ePTFE. In some embodiments, step (iii) further includes bonding the melt processable fluoropolymer to contiguous portion(s) of the wire(s) and/or cable(s) wrapped therein.

Some embodiments of the present invention further comprise marking or printing indicia on the outer side of the outer layer of ePTFE. Some such embodiments further comprise laser marking or ink jet printing indicia on the outer side of the outer layer of ePTFE. Some embodiments further comprise printing the indicia with a solvent-based ink. Some embodiments further comprise laser marking indicia within the second portion of the ePTFE outer layer with the laser-markable pigment loaded therein.

Some embodiments of the present invention further comprise wrapping the composite film about the wire or cable, forming with an edge of the composite film a seam, bonding the melt processable fluoropolymer to a contiguous portion of the melt processable fluoropolymer and/or ePTFE at the seam, and thereby forming an abrasion-resistant, fused seam and abrasion-resistant outer surface of the wrapped wire or cable. Some such embodiments further comprise forming with the edge of the wrapped composite film an overlapping seam, heating the wrap and allowing the melt processable fluoropolymer in the overlapping seam to flow into the pores in the outer surface and second portion of the underlying ePTFE, and bonding the melt processable fluoropolymer thereto. Some such embodiments further comprise forming the overlapping seam by wrapping the composite film in the form of a longitudinally-extending tape around the wire or cable, and overlapping the marginal edges of the tape during wrapping. Some embodiments further comprise applying tension to the longitudinally-extending tape during wrapping. Some embodiments further comprise forming the seam by wrapping the composite film around the wire or cable, placing opposing ends of the composite film in an abutting relationship with each other to form a longitudinally-extending butt seam, and fusing the opposing edges of the melt processable fluoropolymer layer together at the seam and thereby forming an abrasion-resistant outer surface at the seam.

One advantage of the present invention, and/or of the disclosed embodiments, is that they solve many of the issues of the tape wrapped, thin insulation constructions encountered in the above-described prior art, and allow for a final product that looks and functions more like a "seamless" extrusion processed product. The embodiments thus allow for a new composite structure using a combination of both the melt processable fluoropolymer as the inner layer and the expanded ePTFE tape, such as by MDO or TDO, as the outer layer. The construction can thus use the best of extrusion processes and the best of tape wrapping processes for wire insulation, and provides a novel and unexpected solution for thin insulation applications. Another advantage is that overlap of the composite tape when processed will allow the melt layer to flow when heated into the ePTFE pore structure, which forms a stronger bond between the two layers than encountered with prior art PTFE tape wraps. This dramatically increases the bond strength of the two layers in comparison to the above-mentioned prior art. Another advantage is that the composite tape is able to flow by heating and forming of the overlap in, for example, a sintering stage, such that the overlap either appears to disappear, or is so small that it imparts a seamless look to the final wrapped wire product. As a result, the seam overlaps are almost non-existent due to the fact that the melt processable part of the laminate flows and forms so that the overlap at the seam has very little or virtually no height. Accordingly, the disclosed composite wire and cable wraps can achieve superior scrape abrasion testing results as compared to the above-described prior art.

Yet another advantage is that ePTFE is on the outside of the wire while the melt fluoropolymer is located adjacent to or against the wire or wire components after wrapping the composite tape about the wire. The pore structures in the ePTFE on the outside of the wire allows for bonding to or coating of the voids which, in turn, allows for a variety of new opportunities. In prior art tape wrapped wires, the outer layer of the wire may be chemically etched, plasma treated or subjected to a modified corona treatment to facilitate bonding thereto or marking thereon. These treatments increase the surface area to allow bonding, but they only provide for a shallow surface bond. In addition, chemical etching of the wires, such as with sodium or naphthalene, can darken the wire or turn the wire into a darkened color, which is not always optimal. Plasma treatments allow functional groups to be put on the outer surface to allow bonding thereto but, again, only on the outer surface. Another drawback of these treatments is that they can dissipate with high temperature exposure. Accordingly, these treatments are not optimal in, for example, the aerospace industry where the wires can be subjected to relatively high temperature applications. In the composite lamination or tape of the present disclosure, on the other hand, the pore structure in the outer layer allows for a much deeper area for the bonding thereto or for the filling of the voids defined by the pores. Further, because the outer layer of ePTFE may be at least partially sintered, it can maintain its pore structure during subsequent processing to, in turn, facilitate allowing the melt processable fluoropolymer to flow into the pores and bond thereto. For laser markable applications, the outer layer of ePTFE can be filled or otherwise loaded with a laser-markable pigment, such as $TiO_2$, doped $TiO_2$, or combinations thereof. The composite tape of the disclosure allows for very defined dark marking or printing thereon which can be read easily. In addition, the marking or printing is resistant to abrasion and to wearing off, and thus allows for an easily readable and durable marking or printing on the exterior of the wire or cable. Yet another advantage is that the porous outer layer allows for the use of readily available ink marking systems, such as solvent based inks or coatings.

Another advantage of the present invention, and/or of the disclosed embodiments, is that they allow for coloration, such as for wire or cable identification. Adding a pigment to the PTFE film and, in turn, stretching the PTFE film into an ePTFE film as described above, can impart to the outer layer of the wrap a light shade of the pigment color. For example, adding a red pigment to the PTFE film will create a light red or pink ePTFE film. As a result, the wires can be color coded, and further, such color coded wires can be marked or printed thereon, such as by laser marking or ink jet printing. Other materials, such as carbon black for static dissipating needs, or polyimide film fillers for increased abrasion resistance, or for a protective covering, can be added to the outer layer without negatively impacting or weakening the insulation value of the composite film. The non-filled fluoropolymer inner layer achieves an improved electrically insulative barrier, particularly if it is unfilled or if no fillers are added. This in turn leads to improved electrical testing results and a reduction in, or fewer short outs of the wire. Accordingly, fluoropolymer composite film wire or cable wraps of the present disclosure can consistently achieve acceptable, if not superior, wet arc electrical insulation, scrape abrasion, and minimum contrast level for marking wires test results as compared to the above-described prior art. Further, the fluoropolymer composite film wire or cable wraps of the present disclosure can provide such levels of performance in a thin, lightweight construction. As a result, the fluoropolymer composite film wire or cable wraps of the present disclosure are particularly advantageous for wrapping aerospace wires and cables where the need for such thin, lightweight constructions is paramount.

Yet another advantage is that the TDO version of the ePTFE tape can be translucent and thus allow lighter weight constructions of the products. Yet another advantage is that the TDO ePTFE construction allows for wrapping of material(s) under the insulation layer to achieve coloration by, for example, using an inner layer and having it come through or be visible through the outer translucent layer.

Another advantage of the invention, and/or of the disclosed embodiments, is that they allow for the use of different melt fluoropolymers that process at different temperatures. This allows lower temperature materials to be used in constructions that could not be used in the prior art. For example, THV can be processed at a much lower temperature than FEP or PFA. By lowering the temperature of the melt processable fluoropolymer, it allows for lower temperature materials to be used in any under wrapping for insulation (i.e., between the wire or cable and the inner melt processable fluoropolymer layer). These lower temperature materials are often lower in cost and thereby allow for more competitive wire and cable applications.

Other objects of the present invention, and/or of the disclosed embodiments, will become more readily apparent in view of the following detailed description of embodiments and accompanying drawings.

DETAILED DESCRIPTION OF EMBODIMENTS

Figure 1A:
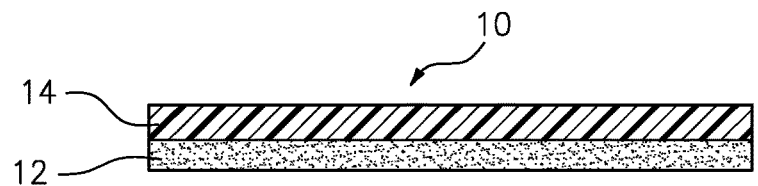
FIG. 1A is a somewhat schematic, cross-sectional view of an embodiment of a fluoropolymer composite film wire or cable wrap.
Figure 5:
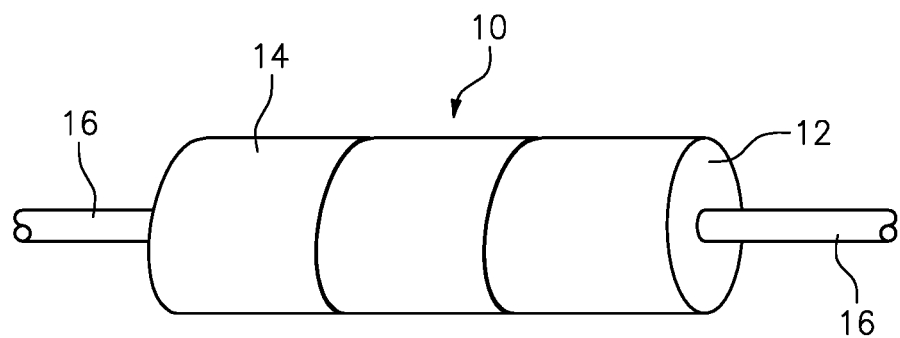
FIG. 5 is a perspective view of wire or cable wrapped with an overlapping seam.

In FIG. 1 a fluoropolymer composite film wire or cable wrap is indicated generally by the reference numeral 10. The composite film 10 comprises an inner layer 12 and an outer layer 14. The outer layer 14 is ePTFE. In the illustrated embodiment, the outer layer 14 is at least partially sintered; however, as may be recognized by those of ordinary skill in the pertinent art based on the teachings herein, the outer layer may be totally unsintered, partially to fully sintered, or fully sintered. The level of sintering of the outer layer 14 can be selected to impart desired characteristics. For example, full sintering can impart relatively high tensile strength and abrasion resistance. In one preferred construction, the outer layer is at least partially sintered, or is partially to fully sintered, in order to impart sufficient tensile strength and wear characteristics, as well as provide a stable pore structure throughout processing, including the making of the laminates and the wrapping of wires with the laminates. The inner layer 12 is a melt processable fluoropolymer film, such as one or more of FEP, PFA, ECTFE, ETFE, CROSS-LINKED ETFE, THV, PEEK, PVDF, and combinations or blends thereof. However, as may be recognized by those of ordinary skill in the pertinent art based on the teachings herein, the inner and outer layers 12, 14 may be made of any of numerous different materials that are currently known, or that later become known, can be combined with additional layers located in between these layers, or overlying either of these layers. As described further below, the inner and outer layers 12, 14 are laminated to each other, such as by the application of heat and/or pressure thereto, and may be manufactured in tape form. As shown typically in FIG. 5, the fluoropolymer composite film 10 is wrapped about one or more wires or cables 16 and the ePTFE layer 14 forms the exterior surface thereof.

In the illustrated embodiment, the inner layer 12 defines a thickness within the range of about ¼ mil to about 5 mils. Preferably, such as for aerospace applications, the inner layer 12 defines a thickness of less than about 3 mils, and for such relatively thin applications, is preferably cast or dispersion coated onto the outer layer 14. In some embodiments, the inner layer 12 is extruded and is laminated to the outer layer 14. In some such embodiments, both the inner and outer layers 12,14 are extruded. In the embodiments where the inner layer 12 is extruded and laminated to the outer layer 14, the foregoing thicknesses of the inner layer are measured prior to laminating the inner layer to the outer layer. If, on the other hand, the inner layer 12 is cast or dispersion coated onto the outer layer 14, the foregoing thicknesses of the inner layer are measured after it is cast or dispersion coated.

The outer layer 14 defines a thickness within the range of about ½ mil to about 20 mils, and preferably defines a thickness within the range of about 1 mil to about 5 mils. In some embodiments, the outer layer 14 is MDO stretched and defines a low density ePTFE film. In one embodiment, the outer layer 14 is MDO stretched within the range of about a 0.5 times to about a 20 times stretch ratio. In another embodiment, the outer layer 12 is TDO stretched within the range of about a 0.5 times to about a 20 times stretch ratio. In each of the above embodiments, the outer layer 14 defines a density within the range of about 1.4 to about 0.2 g/cc, preferably within the range of about 0.9 to about 0.4 g/cc, and more preferably within the range of about 0.7 to about 0.5 g/cc. Generally, the higher the density, the lower is the porosity of the outer layer, and thus the lower may be the resulting bond strength between the inner and outer layers. On the other hand, the lower the density, the greater is the porosity of the outer layer, and thus the greater may be the resulting bond strength between the inner and outer layers.

Figure 7:
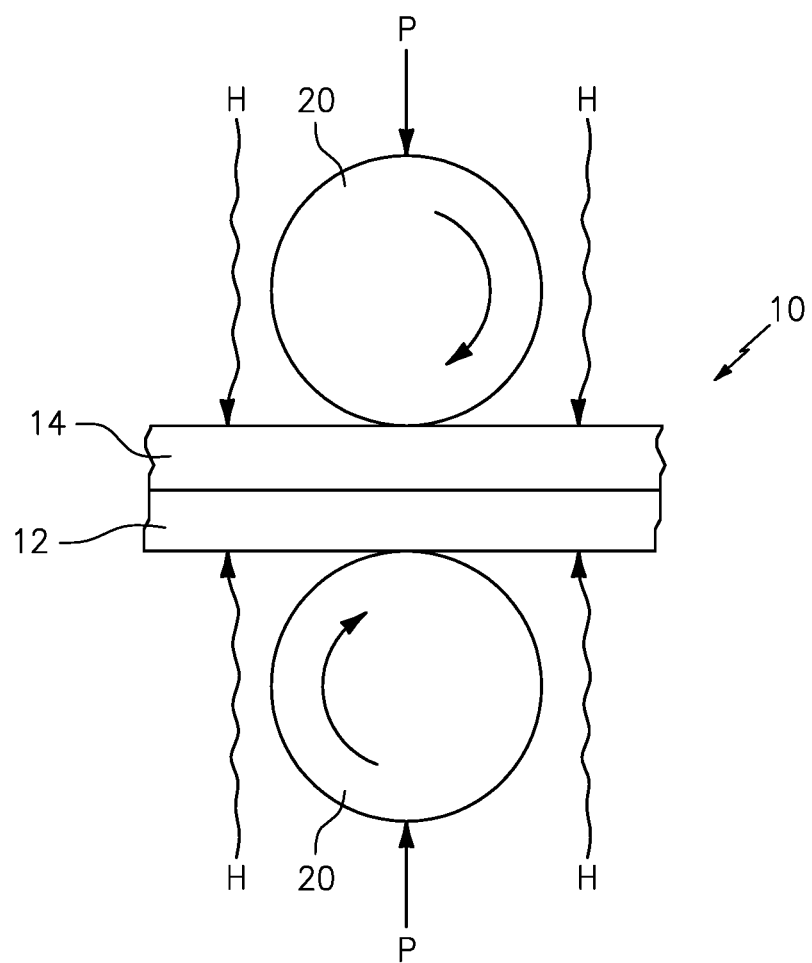
FIG. 7 is a side elevational view of an apparatus for forming a fluoropolymer composite film wire or cable wrap through the application of heat and/or pressure.

Referring to FIG. 7, the inner layer 12 may be laminated to the outer layer 14 by applying at least one of heat "H" and pressure "P" to the layers. Generally, the greater the pressure "P," the lower is the required amount of heat "H" or temperature required to bond the inner and outer layers, and vice versa. If the inner layer is heated to about its melt temperature, then little, if any, pressure may be required to bond the inner and outer layers. For example, the melt temperature of an inner FEP layer is within the range of about 500° F. to about 540° F.; the melt temperature of an inner ETFE layer is within the range of about 427° F. to about 520° F.; and the melt temperature of an inner PFA layer is within the range of about 500° F. to about 582° F. If each such inner layer is heated to about its respective melt temperature, little, if any, pressure is required to bond each such inner layer to an outer ePTFE layer. As the inner melt processable fluoropolymer layer approaches its melt temperature, it transitions and flows into the pores of the outer ePTFE layer and bonds to the outer layer. If, on the other hand, the inner layer is not heated to about its melt temperature, additional pressure may be required to adequately bond the inner and outer layers. Generally, the lower the temperature of the inner layer below its melt temperature, the greater is the pressure that may be required to adequately bond the inner and outer layers. Similarly, the lower the density of the outer layer (i.e., the greater the porosity of the outer layer), the lesser is the amount of heat and/or pressure that may be required to bond the inner and outer layers. In contrast to the inner melt processable fluoropolymer layer, the outer ePTFE layer has a transition temperature of about 620° F., which is significantly higher than the melting temperature of the respective inner layer. The ePTFE layer does not flow like the inner melt processable fluoropolymer layer. Even at higher melt processable fluoropolymer processing temperatures, the ePTFE layer will not melt, and therefore will hold its shape throughout formation and processing of the laminate. As may be recognized by those of ordinary skill in the pertinent art based on the teachings herein, the foregoing temperatures and/or ranges are only exemplary, and numerous other temperatures and/or temperature ranges, and any of numerous pressures, pressure ranges, and time periods for subjecting the laminations to such temperatures, pressures and/or temperature or pressure ranges, equally may be employed.

The heat necessary to bond the layers may be applied through any of numerous different means that are currently known, or that later become known to those of ordinary skill in the pertinent art. As indicated in FIG. 7, the requisite pressure "P" necessary to bond the layers at the applied temperature may be achieved through calendaring rolls 20 in a manner known to those of ordinary skill in the pertinent art. As indicated by the arrows "H" in FIG. 7, heat may be applied during calendaring to subject the lamination to a sufficiently high temperature to bond the layers under the applied pressure "P", such as the temperatures and/or temperature ranges described above. Alternatively, the pressure "P" may be applied by autoclaving, or by any of numerous other mechanisms or processes for applying the requisite pressure for lamination that are currently known, or that later become known.

Figure 6:
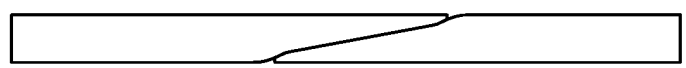
FIG. 6 is a partial, cross-sectional view of a tapered-edge tape wrap seam.

As shown typically in FIGS. 2 through 5, the fluoropolymer composite film wire or cable wrap 10 may be wrapped to individual wires or cables, or wrapped to bundles of wires or cables, in any of numerous different ways that are currently known, or that later become known, including without limitation, wraps defining (i) a spiral or annular overlapping seam (FIGS. 2A and 5), (ii) a longitudinal overlapping seam (FIG. 2C), (iii) a butt seam, or butt splice seam (FIG. 2B), or (iv) a tapered-edge overlapping seam (FIG. 6). After the fluoropolymer composite film 10 is wrapped about the wire or cable, or bundle of wires or cables, the wrapped film is then heated to at least partially melt the fluoropolymer inner layer 12 to fuse the seam and, if desired, to fuse the at least partially melted inner layer to the wire or cable, or to the bundle of wires or cables underlying the composite film, to bond the composite film thereto. In the illustrated embodiment, the melt processable fluoropolymer film contacts the wire or cable, and the ePTFE layer forms the exterior surface thereof. In the overlapping seam embodiments (FIGS. 2A and 2C), the at least partially melted inner layer 12 firmly bonds the fluoropolymer film layer to both an overlying portion of the ePTFE layer 14 and an underlying portion of the ePTFE layer within the overlapping seam to fixedly seal and secure the film or tape at the seams. Similarly, in the butt seams (FIG. 2B), the end of the at least partially melted inner layer 12 firmly bond themselves to each other and to the adjacent or contiguous portions of the outer layer 14 to fixedly seal and secure the film or tape at the seam. The temperature required to bond the inner layer 12 to a wire/cable depends on the selected melt processable fluoropolymer of the inner layer. In each case, the inner layer should be heated to a temperature that is sufficient to cause the material of the inner layer to flow and bond to the outer layer of the wire/cable, which is typically the melt temperature or melt index of the material of the inner layer. Accordingly, the temperature of this processing step is typically at or about the melt temperature of the respective inner layer material. Note that larger cables or bundles of wires/cables may require a greater amount of heat and/or a higher outer layer temperature in order to heat the inner layer to a sufficiently high temperature to cause the inner layer material to flow and bond to the cable/bundle. The outer ePTFE layer has a transition temperature of about 620° F. which is significantly higher than the melt temperature of the above-mentioned inner layers. The ePTFE can be sintered before it is laminated to the inner layer. Alternatively, if the ePTFE must be heated to a temperature that would sinter the ePTFE, either when laminating the inner and outer layers, or when wrapping the resulting laminate to wires/cables, the sintering can be performed during one or both of these processes, or the ePTFE can be further sintered during one or both of these processes. In one embodiment, a lower density ePTFE is employed for the outer layer to provide more pore structure and thereby increase the bond strength between the inner and outer layers during both laminating and wire/cable wrapping processes.

Figure 1B:
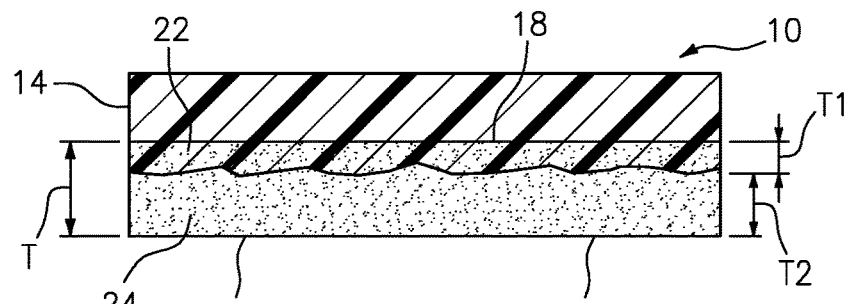
FIG. 1B is an enlarged, somewhat schematic cross-sectional view of the fluoropolymer composite film wire or cable wrap of FIG. 1A showing the unfilled melt processable fluoropolymer received within a first portion of the ePTFE outer layer defining a first thickness (T1) that is less than the overall thickness (T) of the ePTFE outer layer.
Figure 2A:
FIG. 2A is a cross-sectional view of a wire or cable wrapped with a spiral or annular overlapping seam.
Figure 2B:
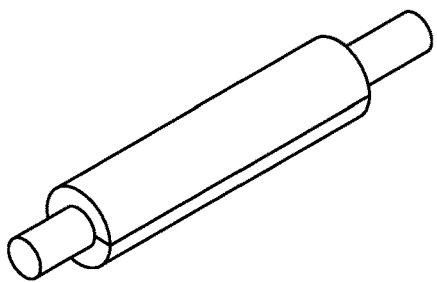
FIG. 2B is a perspective view of a wire or cable wrapped with a butt seam, or butt splice seam.
Figure 2C:
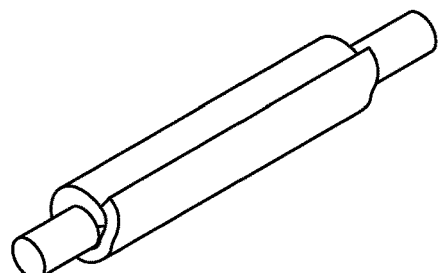
FIG. 2C is a perspective view of a wire or cable wrapped with a longitudinal overlapping seam.
Figure 3:
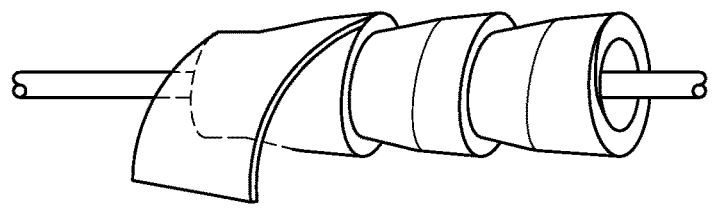
FIG. 3 is a perspective view of a wire or cable undergoing a wrap forming an overlapping seam.
Figure 4A:
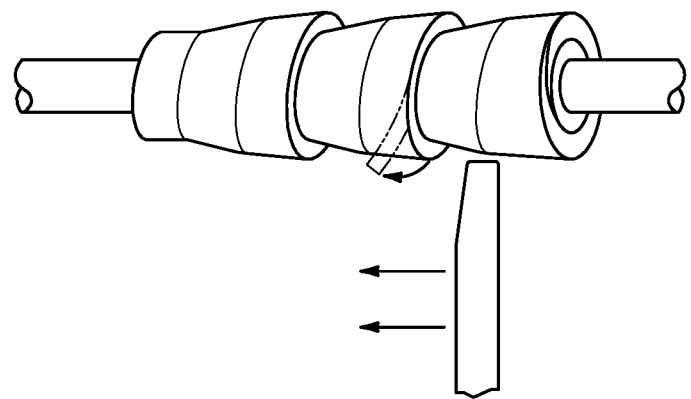
FIG. 4A is a perspective, somewhat schematic view of a wire or cable wrapped with a spiral or annular overlapping seam at the outset of a scrape abrasion test, and indicating with arrows the direction of movement of the scrape abrasion tool, and indicating with another arrow the raised seam edge in the overlapping seam that may be susceptible to abrasion in the scrape abrasion test.
Figure 4B:
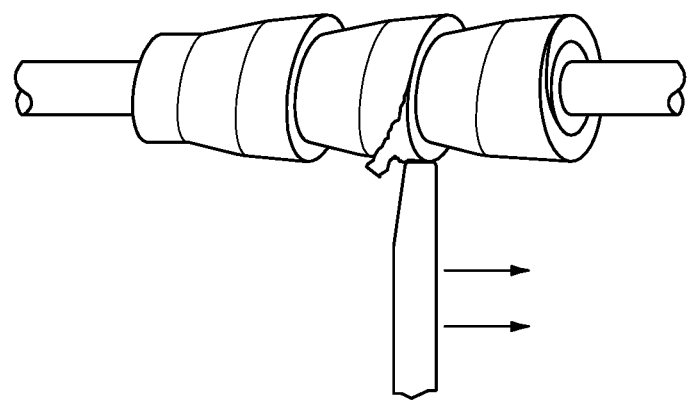
FIG. 4B is another perspective, somewhat schematic view of the wrapped wire of cable of FIG. 4A during the scrape abrasion test, and illustrating the manner in which the scrape abrasion tool can abrade and otherwise damage the raised seam edge in the overlapping seam of a prior art wrap.

As shown typically in FIG. 1B, the ePTFE outer layer 12 defines an inner side 18 and an outer side 20, an overall thickness (T) extending between the inner and outer sides, and a plurality of pores (represented by speckling in FIG. 1B) located between the inner and outer sides. The unfilled, melt processable fluoropolymer inner layer 14 is bonded to the inner side 18 of the ePTFE outer layer 12, and is received within the pores on the inner side 18 of the ePTFE outer layer and is bonded thereto. As indicated above, the unfilled, melt processable fluoropolymer inner layer 14 is configured to contact the wire or cable received within the wrap and form an electrically insulative barrier between the wire or cable and the ambient atmosphere. In one exemplary embodiment, the inner layer 14 is made of FEP. FEP film supplied by the Chemours Company exhibits a dielectric strength of about 8,000 volts per mil at a thickness of about ½ mil, about 6,000 volts per mil at a thickness of about 2 mils, and about 4,000 volts per mil at a thickness of about 4 mils. Accordingly, an unfilled melt processable fluoropolymer inner layer 14, such as an FEP inner layer, can exhibit substantial dielectric strength, and thus can provide a substantial electrically insulative barrier, at thin thicknesses, such as within the range of about ¼ mil to about 5 mils, and preferably less than about 3 mils. The fact that the melt processable fluoropolymer inner layer 14 can exhibit superior dielectric strength, and thus electrically insulative properties, at relatively thin thicknesses, allows for a relatively thin, lightweight construction that is extremely advantageous for aerospace wire and cable wrapping applications.

As also shown in FIG. 1B, the melt processable inner layer 14 extends into a first portion 22 of the ePTFE outer layer 12 defining a first thickness (T1) that is less than the overall thickness (T). The melt processable fluoropolymer flows into the first portion 22 of the ePTFE outer layer 12 during lamination of the inner layer to the outer layer, or during cast or dispersion coating of the inner layer to the outer layer. In addition, during wrapping of the composite film to the wire(s) and/or cable(s), and subsequent heating, the melt processable fluoropolymer can further flow into the first portion 22 of the ePTFE outer layer 12. However, as also shown in FIG. 1B, the melt processable inner layer 14 does not extend into a second portion 24 of the ePTFE outer layer 12 extending from the first portion 22 to the outer surface 20 and defining a second thickness (T2). The outer surface 20 of the ePTFE outer layer and the pores or portions thereof in the second portion 24 are not filled with the melt processable fluoropolymer. As a result, the surfaces defining the pores in the second portion 24 (i) are configured to receive ink from a printer thereon, and/or (ii) the outer ePTFE layer 12 and thus the porous surface of the second portion 24 can be loaded with a laser-markable pigment for laser marking thereon. In some embodiments, the first thickness (T1) is less than the second thickness (T2), may be less than or equal to about ½ the second thickness (T2), and may be less than or equal to about ⅓ the second thickness (T2)

If desired, markings or other indicia can be marked or printed on the exterior surface 20 of the outer layer 14 of ePTFE. The marking or printing can include laser marking, ink jet printing, or any other type or process of marking or printing currently known or that later become known. In one embodiment, the outer layer 12, and thus the outer portion 24 thereof, is laser markable and is filled or otherwise loaded with a laser-markable pigment. The term laser-markable pigment is used herein to mean a pigment that, when irradiated with laser light or other suitable radiation, undergoes a structural transformation that changes the color of the pigment or produces a dark-colored decomposition product. The term laser marking is used herein to mean a process of transmitting laser light or other radiation from a suitable source onto a body or other structure loaded or otherwise containing such a pigment, where the pigment undergoes a structural transformation that changes the color of the pigment or produces a dark-colored decomposition product when subjected to the laser light or other radiation. In some embodiments, the laser-markable pigment can include a UV-laser-markable pigment, or pigments that are tuned to the particular laser wavelength(s) used in a respective laser marking process or device employed to laser mark the wraps. In one embodiment, the laser-markable pigment includes or consists essentially of titanium dioxide ("$TiO_2$"), doped $TiO_2$, or combinations thereof. One such pigment is a dry pigment containing $TiO_2$ particles sold by Chemours Company. Another such pigment is a liquid white pigment containing $TiO_2$ sold by Chromatics, Inc. Such laser-markable pigments can be added in the amounts required to achieve a desired laser marking contrast ratio. Other laser-markable pigments include or consist essentially of other metal oxides, where the metal oxides can be any of the following: $Cr_2O_3$, $NiO$, $V_2O_5$, $Fe_2O_3$, $CuO$, $CdO$, $Tl_2O_3$, $CeO_2$, $Nb_2O_5$, $MoO_3$, $WO_3$, $Sb_2O_3$, $SnO_2$, $ZrO$, $ZnO_2$, or combinations thereof. In another embodiment, a printing ink is employed and the ink is a solvent-based ink.

Prior art laser-markable PTFE tapes/wraps have drawbacks with respect to agglomerations, cracks, fissures, and/or a reduction in the insulation value of the film due to the loading of the laser-markable pigment. However, one advantage of the embodiment including a laser-markable pigment loaded into the ePTFE outer layer, such as one of the above-mentioned titanium dioxide pigments, is that the laminated wrap can overcome the above-described drawbacks and/or disadvantages of such prior art laser-markable PTFE tapes/wraps. Because the inner layer 14 is not filled with a laser-markable pigment, the unfilled inner layer can provide a relatively high insulative value as compared to the outer layer, thus imparting a sufficient insulative value to the laminate as a whole, and a significantly improved insulative value as compared to prior art laser-markable pigment loaded PTFE tapes/wraps.

Yet another advantage is that although the present inventor believed that the pore structure of the ePTFE layer would reduce the laser markability of the outer layer, the laser-markable pigment loaded embodiment of the lamination provided surprising and unexpectedly good laser markability results. When PTFE is stretched to form ePTFE, the material undergoes a transition in appearance from translucent to white. This is believed to be due, at least in part, to the diffraction of light within the pore structure of the ePTFE that is not present in the PTFE prior to stretching. In light of this, the present inventor believed that loading the ePTFE with a laser-markable pigment and, in turn, laser marking the pigment, would not achieve acceptable visible contrast ratios for the marked indicia due to the whitening effect of the expanded pore structure. Indeed, the present inventor was not aware of a commercially-available ePTFE film or lamination where the ePTFE film was loaded with a laser-markable pigment and laser marked with indicia thereon. However, when the present inventor loaded the ePTFE outer layer with laser-markable pigment, he surprisingly and unexpectedly was able to laser mark indicia on the outer layer exhibiting acceptable visible contrast ratios, including for aerospace applications.

A further advantage is that the unfilled second portion 24 of the outer layer 12 allows the marked or printed indicia to be located within the pore structure of the second portion 24 (as opposed to being located only on a solid exterior surface of a solid PTFE or other tape structure), and thus allows for wear-resistant marked or printed indicia. In other words, at least part of the marked or printed indicia is located within the pore structure of the second portion 24 located beneath the outer surface 20, e.g., the ink from an inkjet printer is located within the recesses or voids of the pore structure, and the laser-markable pigment is located within the solid surfaces defining the pore structure. As a result, the marked or printed indicia, or significant portions thereof, can be located beneath the outer surface 20 where it is less susceptible to physical wear. Accordingly, a significant advantage of the wire and cable lamination is that, in addition to providing improved bond strength and abrasion resistance as described above, it can provide improved marked or printed indicia thereon.

A further advantage is that all of these features can be provided in a thin, lightweight construction. In one embodiment, the inner layer 14 defines a thickness prior to laminating/wrapping within the range of about ½ mil to about 2 mils; the outer layer 12 defines an overall thickness (T) within the range of about 1 mil to about 2 mils; and the overall thickness of the composite film 10 (i.e., the combined thicknesses of the outer layer 12 and inner layer 14) is within the range of about ½ mil to about 5 mils, and preferably is within the range of about 1 mil to about 2 mils. Note that the overall thickness of the composite wrap may be less than the accumulated thicknesses of the inner and outer layers prior to laminating and/or wrapping because the heat, pressure, and/or tension applied during such processes can cause the inner layer to flow, including into the outer layer as disclosed herein, and the outer layer can be stretched.

As may be recognized by those of ordinary skill in the pertinent art based on the teachings herein, numerous changes and modifications may be made to the above-described and other embodiments of the present invention without departing from its scope as defined in the appended claims. For example, the lamination can include any desired number of layers to define any of numerous different physical and/or chemical characteristics; the layers may be laminated in accordance with any of numerous different methods and/or apparatus for laminating that are currently known, or that later become known; the fluoropolymer layers of the lamination may take the form of any of numerous different fluoropolymers that are currently known, or that later become known; the layers may be modified to further enhance bondability to each other in accordance with any of numerous different processes or treatments that are currently known, or that later become known; and the fluoropolymer layers may be laminated or otherwise bonded to any of numerous other substrates, other laminations, or other structures. Accordingly, this detailed description of embodiments is to be taken in an illustrative as opposed to a limiting sense.

What is claimed is:

1. A fluoropolymer composite film wire or cable wrap comprising:
an at least partially sintered expanded polytetrafluoroethylene outer layer defining an inner side and an outer side, an overall thickness (T) extending between the inner and outer sides, a plurality of pores located between the inner and outer sides, wherein the expanded polytetrafluoroethylene outer layer is configured to form an abrasion-resistant outer surface for a wire or cable received within the wrap; and an unfilled, melt processable fluoropolymer inner layer bonded to the inner side of the expanded polytetrafluoroethylene outer layer, received within the pores on the inner side of the expanded polytetrafluoroethylene outer layer and bonded thereto, wherein the unfilled, melt processable fluoropolymer inner layer is configured to contact the wire or cable received within the wrap and form an electrically insulative barrier between the wire or cable and an ambient atmosphere, extends into a first portion of the expanded polytetrafluoroethylene outer layer defining a first thickness (T1) that is less than the overall thickness (T), but does not extend into a second portion of the expanded polytetrafluoroethylene outer layer extending from the first portion to the outer surface and defining a second thickness (T2), the outer surface of the expanded polytetrafluoroethylene outer layer and the pores or portions thereof in the second portion are not filled with the melt processable fluoropolymer, and the surfaces defining the pores in the second portion (i) are configured to receive ink from a printer thereon, and/or (ii) are loaded with a laser-markable pigment for marking indicia thereon.

2. A fluoropolymer composite film wire or cable wrap as defined in claim 1, wherein the inner layer is one or more of fluorinated ethylene propylene, perfluoroalkoxy alkane, ethylene chlorotrifluoroethylene, ethylene tetrafluoroethylene, cross linked ethylene tetrafluoroethylene, tetrafluoroethylene/hexafluoropropylene/vinylidene fluoride copolymer, polyether ether ketone, polyvinylidene fluoride, or combinations or blends thereof.

3. A fluoropolymer composite film wire or cable wrap as defined in claim 1, wherein the inner layer defines a thickness that is one or more of (i) within the range of about ¼ mil to about 5 mils; and (ii) less than about 3 mils.

4. A fluoropolymer composite film wire or cable wrap as defined in claim 1, wherein the outer layer defines an overall thickness within the range of one or more of (i) about ½ mil to about 20 mils; and (ii) about 1 mil to about 5 mils.

5. A fluoropolymer composite film wire or cable wrap as defined in claim 1, wherein the first thickness (T1) is one or more of (i) less than the second thickness (T2); (ii) less than or equal to about ½ the second thickness (T2); and (iii) less than or equal to about ⅓ the second thickness (T2).

6. A fluoropolymer composite film wire or cable wrap as defined in claim 1, wherein the inner layer defines a thickness within the range of about ½ mil to about 2 mils, and the outer layer defines an overall thickness (T) within the range of about 1 mil to about 2 mils.

7. A fluoropolymer composite film wire or cable wrap as defined in claim 1, wherein the overall thickness of the composite film is within the range of one or more of (i) about ½ mil to about 5 mils; and (ii) about 1 mil to about 2 mils.

8. A fluoropolymer composite film wire or cable wrap as defined in claim 1, wherein the outer layer is stretched in a machine direction orientation and defines a low density film.

9. A fluoropolymer composite film wire or cable wrap as defined in claim 8, wherein the outer layer is stretched in a machine direction orientation within the range of about a ½ times to about a 20 times stretch ratio.

10. A fluoropolymer composite film wire or cable wrap as defined in claim 1, wherein the outer layer defines a density within the range of about 1.4 to about 0.2 g/cc.

11. A fluoropolymer composite film wire or cable wrap as defined in claim 1, wherein the outer layer is sintered within the range of partially sintered to fully sintered.

12. A fluoropolymer composite film wire or cable wrap as defined in claim 1, wherein the melt processable fluoropolymer is located within substantially all of the pores on the inner side of the outer layer, and is bonded to the outer layer therein.

13. A fluoropolymer composite film wire or cable wrap as defined in claim 1, further comprising one or more wires or cables, wherein the fluoropolymer composite film is wrapped about the one or more wires or cables, the melt processable fluoropolymer inner layer is in contact with one or more of the wires or cables, provides an electrically insulative barrier between the one or more wires and cables and the ambient atmosphere, and the expanded polytetrafluoroethylene outer layer forms an abrasion-resistant exterior surface for the one or more wires and cables.

14. A fluoropolymer composite film wrapped wire or cable as defined in claim 13, wherein the outer layer includes laser marked or ink jet printed indicia thereon.

15. A fluoropolymer composite film wrapped wire or cable as defined in claim 14, wherein the indicia is printed with a solvent based ink.

16. A fluoropolymer composite film wrapped wire or cable as defined in claim 14, wherein the outer layer includes a laser-markable pigment, and the laser-markable pigment includes or consists essentially of $TiO_2$, doped $TiO_2$, or combinations thereof.

17. A fluoropolymer composite film wire or cable wrap as defined in claim 1, wherein the outer layer includes one or more of (i) a color pigment, (ii) carbon black or other static dissipative filler for static dissipation, and (iii) a polyimide film filler or other abrasion-resistant filler for abrasion resistance.

18. A fluoropolymer composite film wire or cable wrap as defined in claim 1, wherein the outer layer is stretched in a transverse direction orientation and is substantially translucent.

19. A fluoropolymer composite film wire or cable wrap as defined in claim 18, wherein the inner layer is colored and the color of the inner layer is visible through the substantially translucent outer layer.

20. A fluoropolymer composite film wrapped wire or cable as defined in claim 13, wherein an edge of the composite film forms a seam, the melt processable fluoropolymer is bonded to contiguous melt processable fluoropolymer and/or expanded polytetrafluoroethylene at the seam, and thereby forms an abrasion-resistant, fused seam and abrasion-resistant outer surface of the wrapped wire or cable.

21. A fluoropolymer composite film wrapped wire or cable as defined in claim 20, wherein an edge of the wrapped composite film forms an overlapping seam, and the melt processable fluoropolymer in the overlapping seam is received within pores in the outer surface and second portion of the underlying expanded polytetrafluoroethylene and is bonded thereto.

22. A fluoropolymer composite film wrapped wire or cable as defined in claim 21, wherein the composite film is in the form of a longitudinally-extending tape that is wrapped around the wire or cable, and the marginal edges of the tape overlap one another and define the overlapping seam.

23. A fluoropolymer composite film wrapped wire or cable as defined in claim 21, wherein the composite film defines a longitudinally-extending overlapping seam.

24. A fluoropolymer composite film wrapped wire or cable as defined in claim 20, wherein the composite film defines a longitudinally-extending butt seam formed by opposing edges of the composite film abutting one another, and opposing edges of the melt processable fluoropolymer layer are fused together at the seam and thereby form an abrasion-resistant outer surface at the seam.

25. A fluoropolymer composite film wrapped wire or cable as defined in claim 13, comprising a bundle of one or more of wires or cables wrapped within the fluoropolymer composite film.

26. A fluoropolymer composite film wrapped wire or cable as defined in claim 25, wherein one or more of the wires or cables in the bundle is individually wrapped in a respective fluoropolymer composite film wire or cable wrap as defined in claim 1.

27. A wire or cable wrap comprising:
first means for wrapping around the wire or cable and for forming an abrasion-resistant outer surface of the wire or cable, wherein the first means is at least partially sintered, defines an inner side and an outer side, an overall thickness (T) extending between the inner and outer sides, and a plurality of pores located between the inner and outer sides; and
second means for forming an electrically insulative barrier between the wire or cable wrapped within the first means and an ambient atmosphere, wherein the second means is unfilled, is melt processable, is bonded to the inner side of the first means, is received within the pores on the inner side of the first means and bonded thereto, extends into a first portion of the first means defining a first thickness (T1) that is less than the overall thickness (T), but does not extend into a second portion of the first means extending from the first portion to the outer surface and defining a second thickness (T2), the outer surface of the first means and the pores or portions thereof in the second portion are not filled with the second means, and the surfaces defining the pores in the second portion (i) are configured to receive ink from a printer thereon, and/or (ii) are loaded with a laser-markable pigment for marking indicia thereon.

28. A wire or cable wrap as defined in claim 27, further comprising one or more wires or cables, wherein the wrap is wrapped about the one or more wires or cables, the second means is in contact with one or more of the wires or cables, provides an electrically insulative barrier between the one or more wires and cables and the ambient atmosphere, and the first means forms an abrasion-resistant exterior surface for the one or more wires and cables.

29. A wire or cable wrap as defined in claim 27, wherein an edge of the wrap forms a seam, the second means is bonded to contiguous second means and/or first means at the seam, and thereby forms an abrasion-resistant, fused seam and abrasion-resistant outer surface of the wrapped wire or cable.

30. A wire or cable wrap as defined in claim 29, wherein an edge of the wrap forms an overlapping seam, and the second means in the overlapping seam is received within pores in the outer surface and second portion of the underlying first means and is bonded thereto.

31. A wire or cable wrap as defined in claim 27, wherein the first means is an expanded polytetrafluoroethylene outer layer, and the second means is a melt processable fluoropolymer inner layer.

32. A method comprising the following steps:
(i) wrapping the fluoropolymer composite film wire or cable wrap as defined in claim 1 about one or more wires or cables, wherein the wrapping includes placing the unfilled, melt processable fluoropolymer inner layer in contact with the one or more wires or cables received within the composite film and thereby electrically insulating the one or more wires or cables within the melt processable fluoropolymer inner layer with respect to an ambient atmosphere;
(ii) forming at the edges of the composite film wrapped about the wire or cable a seam defining an interface at the melt processable fluoropolymer; and
(iii) heating the wrapped film and allowing the melt processable fluoropolymer to flow across the interface of the seam and bond to contiguous melt processable fluoropolymer and/or expanded polytetrafluoroethylene and thereby form a fused seam and abrasion-resistant outer surface of the wrapped one or more wires or cables, wherein the surfaces defining the pores in the second portion of the expanded polytetrafluoroethylene outer layer (i) are configured to receive ink from a printer for printing indicia thereon, and/or (ii) are loaded with a laser-markable pigment for marking indicia thereon.

33. A method as defined in claim 32, wherein step (i) includes wrapping the fluoropolymer composite film about a bundle of wires and/or cables such that the expanded polytetrafluoroethylene layer forms the exterior surface of the bundle.

34. A method as defined in claim 33, further comprising wrapping one or more of the wires or cables in a bundle with a composite film as recited in claim 32.

35. A method as defined in claim 32, wherein the melt processable fluoropolymer is one or more of fluorinated ethylene propylene, perfluoroalkoxy alkane, ethylene chlorotrifluoroethylene, ethylene tetrafluoroethylene, tetrafluoroethylene/hexafluoropropylene/vinylidene fluoride copolymer, polyether ether ketone, polyvinylidene fluoride, or combinations or blends thereof.

36. A method as defined in claim 32, wherein the inner layer defines a thickness that is one or more of (i) within the range of about ¼ mil to about 5 mils; or (ii) less than about 3 mils.

37. A method as defined in claim 32, wherein the outer layer defines an overall thickness within the range of one or more of (i) about ½ mil to about 20 mils; or (ii) about 1 mil to about 5 mils.

38. A method as defined in claim 32, wherein the first thickness (T1) is one or more of (i) less than the second thickness (T2); (ii) less than or equal to about ½ the second thickness (T2); or (iii) less than or equal to about ⅓ the second thickness (T2).

39. A method as defined in claim 32, wherein the inner layer defines a thickness within the range of about ½ mil to about 2 mils, and the outer layer defines an overall thickness (T) within the range of about 1 mil to about 2 mils.

40. A method as defined in claim 32, wherein step (iii) further comprises at least partially sintering to fully sintering the outer layer of expanded polytetrafluoroethylene.

41. A method as defined in claim 32, further comprising printing or marking indicia on the outer side of the outer layer of expanded polytetrafluoroethylene.

42. A method as defined in claim 41, further comprising laser marking or ink jet printing indicia on the outer side of the outer layer of expanded polytetrafluoroethylene.

43. A method as defined in claim 41, further comprising printing the indicia with a solvent-based ink.

44. A method as defined in claim 41, further comprising laser marking indicia within the second portion of the expanded polytetrafluoroethylene outer layer with the laser-markable pigment loaded therein.

45. A method as defined in claim 32, wherein step (iii) further comprises at least partially bonding the melt processable fluoropolymer to the one or more wires or cables.

46. A method as defined in claim 32, further comprising wrapping the composite film about the one or more wires or cables, forming with an edge of the composite film a seam, bonding the melt processable fluoropolymer to contiguous melt processable fluoropolymer and/or expanded polytetrafluoroethylene at the seam, and thereby forming an abrasion-resistant, fused seam and abrasion-resistant outer surface of the wrapped one or more wires or cables.

47. A method as defined in claim 46, further comprising forming with the edge of the wrapped composite film an overlapping seam, heating the wrap and allowing the melt processable fluoropolymer in the overlapping seam to flow into pores in the outer surface and second portion of the underlying expanded polytetrafluoroethylene, and bonding the melt processable fluoropolymer thereto.

48. A method as defined in claim 46, further comprising forming the overlapping seam by wrapping the composite film in the form of a longitudinally-extending tape around the one or more wires or cables, and overlapping the marginal edges of the tape during wrapping.

49. A method as defined in claim 48, further comprising applying tension to the longitudinally-extending tape during wrapping.

50. A method as defined in claim 46, further comprising forming the seam by wrapping the composite film around the one or more wires or cables, placing opposing ends of the composite film in an abutting relationship with each other and thereby forming a longitudinally-extending butt seam, and fusing opposing edges of the melt processable fluoropolymer layer together at the seam and thereby forming an abrasion-resistant outer surface at the seam.

* * * * *